United States Patent [19]

Tsukada et al.

[11] Patent Number: 4,995,103
[45] Date of Patent: Feb. 19, 1991

[54] PRINT CONTROL METHOD AND SYSTEM

[75] Inventors: Masaki Tsukada, Katsuta; Kikuo Hatazawa, Atsugi, both of Japan

[73] Assignees: Hitachi, Ltd.; Hitachi Koki Co., Ltd., both of Tokyo, Japan

[21] Appl. No.: 406,596

[22] Filed: Sep. 13, 1989

[30] Foreign Application Priority Data

Sep. 14, 1988 [JP] Japan .................................. 63-231097

[51] Int. Cl.⁵ ............................................. G06K 15/00
[52] U.S. Cl. ..................................... 364/519; 358/451
[58] Field of Search ............................... 364/518-520, 364/235 MS, 930 MS; 355/55, 311; 346/154; 358/296, 451

[56] References Cited

U.S. PATENT DOCUMENTS 4,647,188 3/1987 Komiya et al. ........................ 355/55
4,743,963 5/1988 Abuyama ............................. 358/451

FOREIGN PATENT DOCUMENTS 57-212537 12/1982 Japan .................................. 364/519
58-115536 7/1983 Japan .................................. 364/519
62-60026 3/1987 Japan .................................. 364/519

Primary Examiner—Arthur G. Evans
Attorney, Agent, or Firm—Antonelli, Terry, Stout & Kraus

[57] ABSTRACT

A print control method and system for use with a printer which includes means for setting a printing magnification therefor and is capable of printing print data with the set magnification. In this method and system, print data of the same printing magnification as set in the other data which have a magnification or magnifications different from that set in the printer. After completion of printing of the print data of the same magnification, the printer is permitted to start printing with another magnification. According to necessity, time limit may be introduced in the preferential printing of the data of the same magnification. In this case, the set of the magnification in the printer may compulsively be changed after lapse of time limit to equalize the printing priority of the data.

20 Claims, 12 Drawing Sheets

PRINT CONTROL METHOD AND SYSTEM

BACKGROUND OF THE INVENTION a. Field of the Invention

This invention relates to a print control method and system for use with a printer having a reduction/magnification function therein. More particularly, this invention relates to a print control method and system especially suited for control of print data having various printing formats such as printing magnifications or printing scale sizes.

b. Background Art

When jobs executed or processed by a data executing or processing unit are required to be printed out, print data of the jobs are stored sequentially in a storage, so-called spool (simultaneous peripheral operations online) file. The stored data are then taken out sequentially and sent to a printer to be printed out thereby. FIG. 4 illustrates a general configuration of a printing system.

The printing system shown in FIG. 4 comprises a job executing section 402, a spool file 403 used as a storage for storing print data obtained as results of job execution by the section 402, a printer 406 for printing out the print data on paper, a printer control unit 405 for controlling the printer, and an output control section 404 for outputting the print data stored in the spool file 403 to the printer control unit 405.

The job executing section 402 and the output control section 404 may be provided in the form of hardwares specifically dedicated thereto, respectively, or they may be functions implemented in combination by a central processing unit (CPU) 401 and a software. The spool file 403 comprises a storage in the form of a hardware and it is under control of CPU 401.

In the printing system as illustrated in FIG. 4, printing of data is controlled as follows:

A job applied to CPU 401 is executed by the job executing section 402 and the execution results are stored sequentially in the spool file 403. Upon receipt of an output demand, CPU 401 actuates the output control section 404. The output control section 404 sequentially outputs and sends the execution results, namely, print data and output format, which are stored in the spool file 403, to the printer control unit 405. The printer control unit 405 edits the print data according to the output format and converts the same into dot data. The print data is then sent to the printer 406. The printer 406 outputs the data in the form of print on paper.

Prior arts related to the printing system of the type as described above include, for example, a job execution result output control system as disclosed in Japanese Publication of Unexamined Pat. Application (KOKAI) No. 57-21253 which is capable of inhibiting unnecessary job print-output in the data processing system for print-outputting the program execution results.

Japanese Publication of Unexamined Pat. Application No. 58-115536 discloses an automatic printing system suitable for data printing which involves repetitious routine operation as can be seen in printing out of a spool magnetic tape. In this system, once job is initiated, the printing can be carried out continuously only by replacing magnetic tapes. Thus, initiation operation for a new job which would otherwise be needed upon every replacement of magnetic tapes is not required any more.

Another Japanese Publication of Unexamined Pat. Application No. 62-60026 discloses an arrangement for a relatively small-scaled computer system in which print data transmitted from a plurality of processing units which operate independently of each other can be outputted pigeonholedly by processing units through a single printer.

In this connection, it is to be noted that some printer such as a laser beam printer has a function of effecting reduction and/or magnification printing. This type of printer may be applied to a printing system as shown in FIG. 4. This is illustrated in FIG. 5.

The printer as illustrated in FIG. 5 comprises a laser beam generating unit 502, a modulator 504 for modulating a laser beam 503 emitted from the laser beam generating unit 502 by a modulating signal 501 from the printer control unit 405, a reflection mirror 505 for reflecting the modulated laser beam from the modulator 504, a photoconductive drum 508 for forming a latent electrostatic image by the modulated laser beam irradiated thereon, a polygon mirror 506 for reflecting the reflected laser beam 503 so as to scan the surface of the photoconductive drum 508, and an FO lens 507.

In the printing system shown in FIG. 5, the photoconductive drum 508 and the polygon mirror 506 are rotated with a given period to effect printing. The dot data transmitted from the printer control unit 405 is applied to the modulator 504 as a modulating signal to modulate a laser beam 503 emitted from the laser beam generating unit 502. The modulated laser beam 503 irradiates the photoconductive drum 508 through the reflection mirror 505, the polygon mirror 506 and the FO lens 507. As a result of this, a latent electrostatic image corresponding to the irradiated beam patterns is formed on the photoconductive drum 508. The electrostatic image is developed by a toner. The toner image is transferred to paper and fused by heat to make it permanent. Thus, printing is attained.

In the printing system as described above, magnification or reduction may be changed by changing the rotation periods of the photoconductive drum 508 and the polygon mirror 506. For example, the rotation period of the photoconductive drum 508 is extended or the rotational speed is reduced, and the rotation period of the polygon mirror 506 is shortened or the rotational speed thereof is increased to reduce the size of the latent image formed on the photoconductive drum 508. The image is developed and transferred onto paper to attain printing in reduced scale.

In the printing system as illustrated in FIG. 4, the print data stored in the spool file 403 as the result of the job execution are selected to be printed on the first-stored first-served basis. Even though the printing conditions, especially, printing magnifications of the print data are different from each other, the print data are transmitted to the printer according to the order in which the data have been stored. Consequently, the printing magnifications of the respective data are read to be set in the printer in the order and the data are printed in the order, too. Therefore, if the printing magnifications of the data are different from each other, the printing magnification to be set in the printer must be changed upon every change of the print data.

However, when the photoconductive drum 508 and the polygon mirror 506 are instructed to change their rotation periods for changing the printing magnification, they can not be controlled to the desired rotational periods immediately. It requires a certain time to put them into stable rotation. Therefore, if the printing magnifications of the print data are different, the setting of the printing magnification must be changed upon every change of the print data. It requires an adjusting time whenever the printing magnification is changed. Thus, the entire printing requires longer time.

It is now assumed that three jobs of different printing magnifications, for example, a first job of output format B, a second job of output format A and a third job of output format B are stored in the spool file 403, and that the output format A corresponds to print magnification of 100% (original size) and the output format B to printing magnification of 80% (reduction). It is further assumed that it takes, for example, about 3 minutes to change the printing modes from B to A or vice versa. In this case, if the printing now completed is not in mode A, it takes about 12 minutes in total for changing the modes only, if the first job is printed in mode B, the second job in mode A, the third job in mode B and a further job is to be set in another mode. Thus, when it is required to print data of a number of jobs, it requires a considerable time to complete the printing thereof.

As can be understood from the description given above, every change of the printing magnifications requires an adjusting time, which is necessitated in the printing of a number of jobs having different printing magnifications in the printing system having a function of setting a printing magnification therein. It, therefore, requires a considerably long time to complete entire printing of the data.

Of course, a light emitting diode array may be used as a light source for a printer. In this case, however, the rotational period of the photoconductive drum must also be changed. This again will cause similar problems to those as described above.

SUMMARY OF THE INVENTION

It is therefore an object of the present invention to provide a print control method and system which is capable of reducing or saving the time required for changing the printing magnifications when print data of a plurality of jobs of different printing magnifications are printed.

The present invention features a print control method for use with a printing system which includes means for setting a printing magnification and is capable of printing data for print with the set magnification, comprising the steps of: selecting data of the same printing magnification as set in the printer with priority over other data of a different magnification, or magnifications to transmit the data of the same magnification to the printer to let the printer print said data of the same magnification preferentially; and setting another printing magnification in the printer after completion of the printing of said data of the same printing magnification to allow the printer to start printing with said another printing magnification.

This invention further features a print control system having means for setting a printing magnification therefor and capable of printing with the set printing magnification, as illustrated in FIG. 2. This system comprises print data selecting means for preferentially selecting print data of the same printing magnification as set in the printer with a priority over other print data of a different or different printing magnifications to transmit the data to the printer; and print mode changing means for setting another printing magnification after completion of the printing of said data of the same printing magnification to change the printing mode of the printer to another in which printing is effected with said another printing magnification.

In the print control method of the present invention, the print data may preferably be stored into a storage and the step of selecting the data may include steps of searching the print data for the printing magnification same as that set in the printer from the data stored in the storage and taking out said data of the same printing magnification preferentially over the print data of a magnification or magnifications different from that set in the printer.

To attain this, the system of the present invention may preferably further comprise a storage for storing the print data. The print data selecting means has a function to check the printing magnifications of the print data stored in the storage and it preferentially takes out the print data of the same printing magnification as set in the printer with priority over other print data of a different printing magnification or magnifications.

In a preferred mode, the step of selecting the data comprises a step of discriminating the print data of the different magnification or magnifications to hold said data discriminatedly from the print data which have not been subjected to searching yet, and the step of setting another printing magnification is carried out after all the print data in the storage have been subjected to the searching.

To this end, the system of the present invention further comprises print data holding means for holding the print data of the printing magnification or magnifications different from that set in the printer discriminatedly from print data which have not been checked with respect to their printing magnifications yet. The print mode changing means has a function to judge if there are print data in the storage which have not been checked with the print magnifications yet. Any of the printing magnifications of the print data discriminatedly held in the storage is set in the printer to allow the printer to change the printing mode in which the printing is carried out with said another printing magnification when there remain no print data which have not been checked with the printing magnifications.

In another preferred mode, the selection of the print data of the same magnification as set in the printer is allowed only within a time limit set preliminarily and said another printing magnification is set in the printer after the time limit has been over.

For carrying out this, the system of the present invention may further comprise time limit setting means which sets time limit and provides the print data selecting means an instruction to end the selection of the print data of the same printing magnification as set in the printer after the time limit has been over. The print mode changing means sets another printing magnification in the printer in response to said instruction to let the printer print with the newly set printing magnification.

In a further preferred mode, the selection of the print data of the same magnification as set in the printer is allowed only within a time limit set preliminarily and it is checked if there are print data which are of a magnification or magnifications different from that set in the printer and have not been printed yet after lapse of the time limit. The print data of the same printing magnification as set in the printer is allowed to be selected if there are no relevant print data and the different magnification or any of the different magnifications is set in the printer to allow the printer to start printing with the different magnification.

The system preferably employable for this preferred mode of the invention may further comprises time limit setting means which sets time limit and provides the print data selecting means an instruction to end the selection of the print data of the same printing magnification as set in the printer after the time limit has been over. The print mode changing means has a function to check in response to said instruction if there are unprinted print data of a printing magnification or magnifications different from that set in the printer. The print mode changing means sets, if the unprinted print data of the printing magnification or magnifications different from that set in the printer are detected in the checking, the printing magnification or one of the printing magnifications of said data in the printer to let the printer print with the newly set printing magnification. On the other hand, it allows the print data of the same printing magnification as set in the printer to be selected again if such data are not detected.

Alternatively, the preferred mode of the system may further comprise print data holding means for holding, in association with the print data selection from the storage, print data of a printing magnification or magnifications different from that set in the printer discriminatedly from print data which have not ben checked with respect to the printing magnifications. The system may further comprise time limit setting means which sets time limit and provides the print data selecting means an instruction to end the selection of the print data of the same printing magnification as set in the printer after the time limit has been over. The print mode changing means has a function to search the print data holding means in response to said instruction for unprinted print data of a printing magnification or magnifications different from that set in the printer and it sets the printing magnification or one of the printing magnifications of the detected data in the printer to let the printer print with the newly set printing magnification if the unprinted print data of the printing magnification or magnifications different from that set in the printer are detected. It, however, allows the print data of the same printing magnification or magnifications as set in the printer to be selected again if such data are not detected.

The means and the functions which constitute the print control system according to the present invention may be presented in various forms. For example, they may be formed in combination of hardwares such as CPU, a storage, a timer, etc. and software for controlling CPU.

For example, the print data selecting means comprises CPU as a principal hardware and it is implemented so that CPU reads the printing magnification for the print data stored in the storage by the software and if the read magnification is a desired one, the print data is sent to the printer.

Similarly, the print mode changing means also comprises CPU as a hardware and its principal or various functions and means are implemented by the software.

A specific holding area may be set in the storage so that the print data holding means may store in such a set area the print data to be discriminated from other print data. It suffices to be able to distinguish said data from the other print data and it is not needed to hold the print data themselves discriminatedly from the other data. For example, the addresses of said print data may be held discriminatedly, or flags may be set for the respective print data.

According to the present invention, when there are a plurality of print data of different printing magnifications, the print data of the same printing magnification as set in the printer are preferentially printed with priority over other print data of other printing magnifications. With this arrangement, it suffices to carry out the change of the printing magnification in the printer only when the print data of the same printing magnification have been completed.

Consequently, the magnification changing frequency can be much lowered. As a result of this, even when there are various print jobs of different printing magnifications, the time required for changing the magnification can be reduced or minimized to effectively attain the desired printing and to shorten the overall printing time.

In the case where the preferential selection of the print data of the same printing magnification is carried out by storing the print data once in the storage and then checking the printing magnifications of the respective print data, the print data which have been checked but are not of the same printing magnification, are held discriminatedly from data which have not been checked yet. This can improve the efficiency of the magnification checking. Any of the print data which are held because they are not of the desired printing magnification may be selected as a next printing magnification to be set in the printer.

In the case where time limit is introduced into the selection of the print data of the same printing magnification, such a state in which a major number of print data having a specific printing magnification are preferentially printed is released to allow other jobs having print data of other magnifications to be printed without too much delay.

DESCRIPTION OF THE EMBODIMENTS

Figure 1:
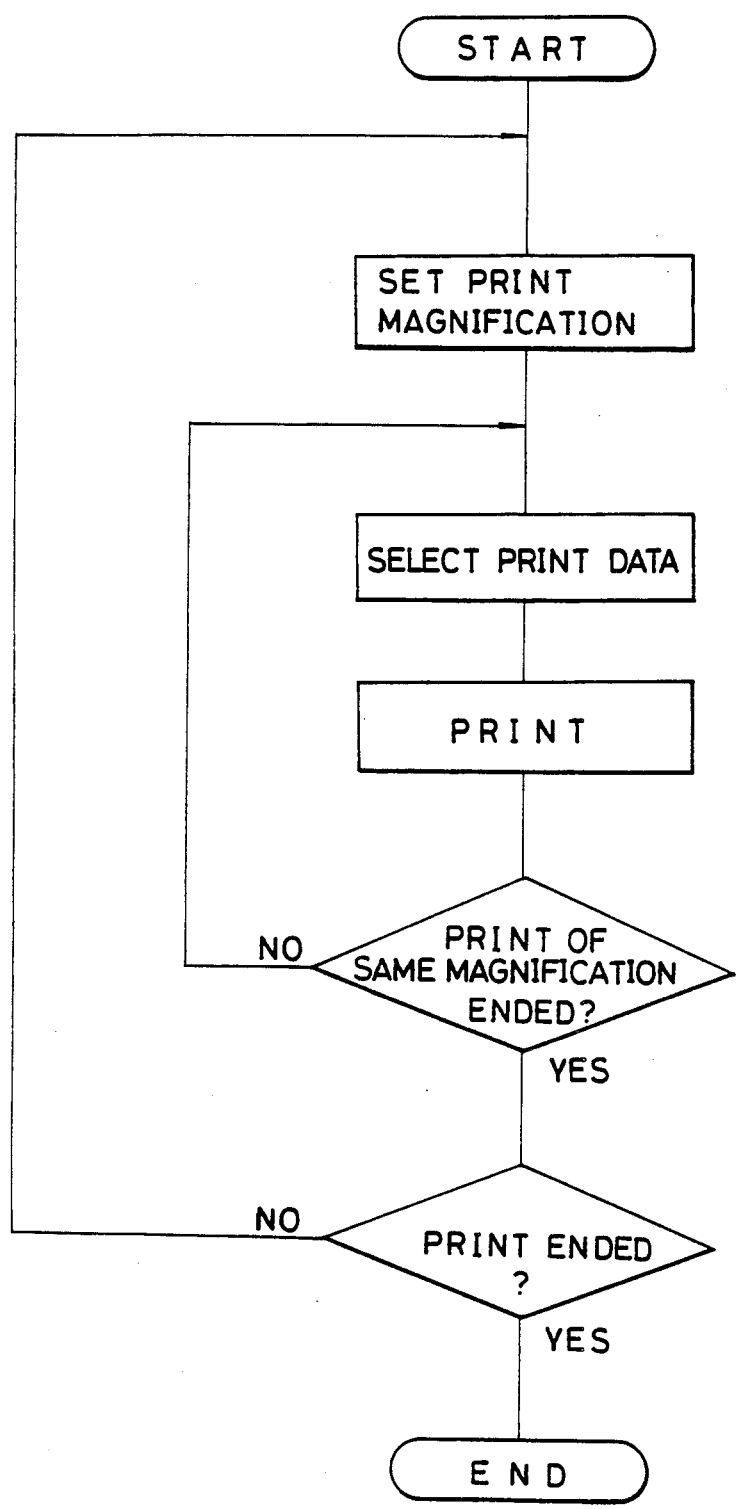
FIG. 1 is a flowchart showing a basic idea of print control method according to the present invention.
Figure 2:
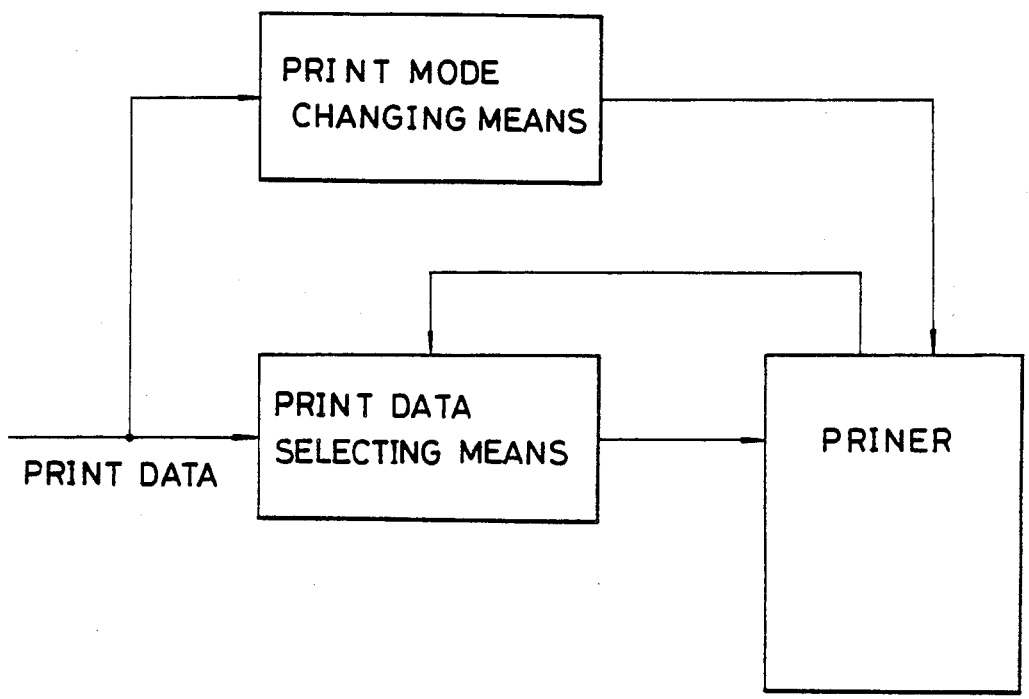
FIG. 2 is a block diagram showing a basic configuration of the print control system according to the present invention.

Embodiments of the present invention will now be described referring to the drawings.

Figure 3A:
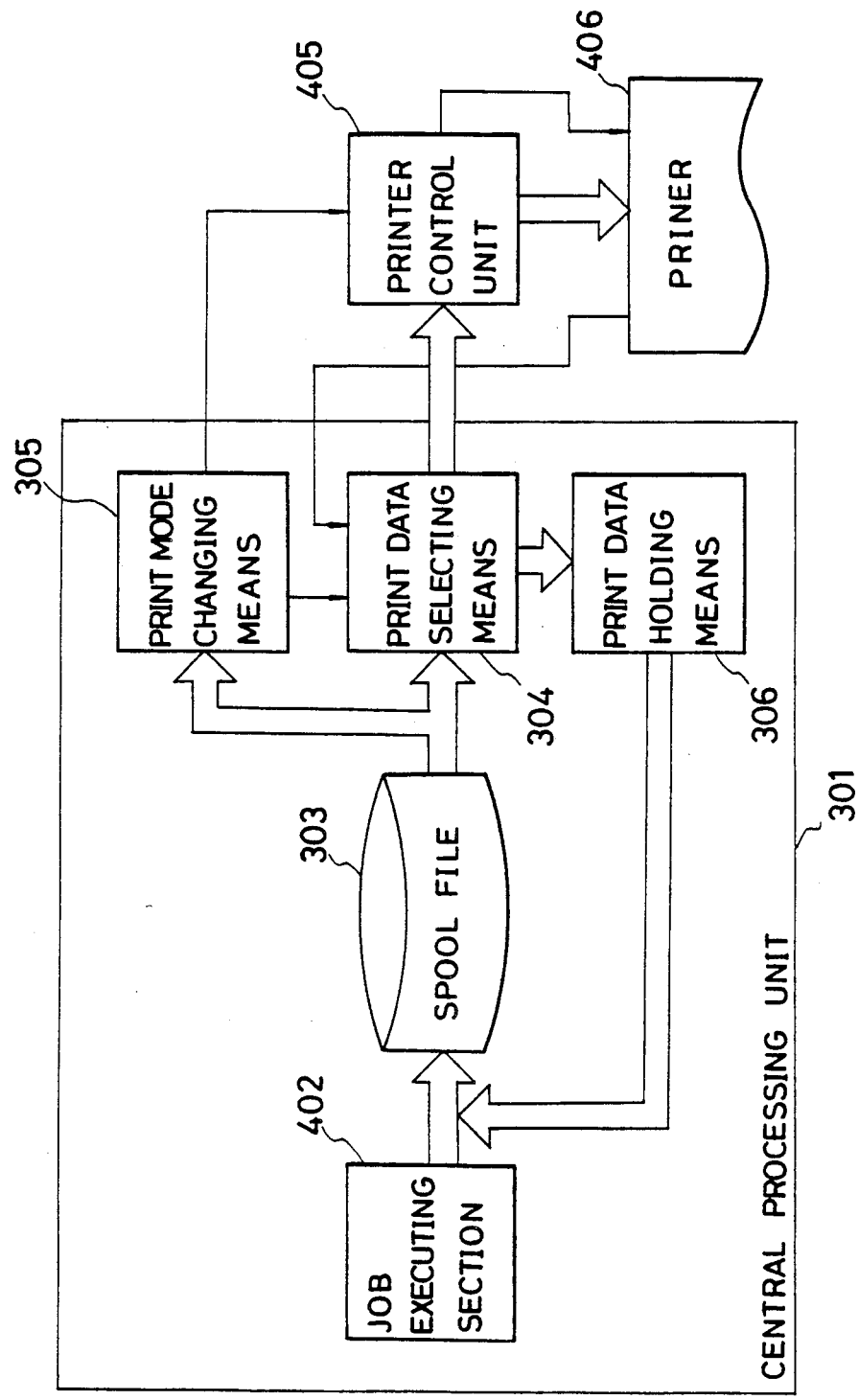
FIG. 3A is a block diagram of principal functions of one form of the print control system according to the present invention.

FIG. 3A illustrates a configuration of a first form of a print control system embodying the present invention.

The print control system according to this first embodiment illustrated in FIG. 3A comprises a job executing section 402, a spool file 303, a printer 406, a printer control unit 405, a print data selector means 304, a print mode changing means 305 and a print data holding means 306. The spool file 303 functions as a storage for storing print data obtained as the results of job execution by the job executing section 402. The printer 406 prints out the print data on paper and the printer control unit 405 controls the printer 406. The print data selector means 304 selects print data from the data stored in the spool file 303 which have the same print magnification as set in the printer 406 and outputs the same to the printer control unit 405. The print mode changing means 305 changes the printing mode and the print data holding means 306 holds the print data having the print magnification other than that set in the printer 406. The print mode changing means 305 makes the print magnification of the printer change and the print data hold means 306 holds the print data of a print magnification or magnifications different from that set in the printer by discriminating them, in the data selection, from the print data which have not yet checked for their respective print magnifications.

More specifically, the print data selector means 304 has a function to check the print magnifications of the print data stored in the storage constituting the spool file 303. This means 304 functions to take out the print data from the storage which are of the same print magnification as set in the printer 406 with priority over the print data of another print magnification.

The print mode changing means 305 has a function to determine whether there remain the print data for which the print magnifications have not yet been checked in the storage constituting the spool file 303 or not. When it is determined there are no print data in the storage whose print magnifications have not checked, the print mode changing means 305 instructs the printer control unit 405 to set one of the print magnifications of the print data held discriminatedly as described above (hereinafter referred to as "discriminated print data" or "discriminated data" in the printer 406. Thus, the printer 406 is now allowed to start printing with a newly set print magnification.

Figure 4:
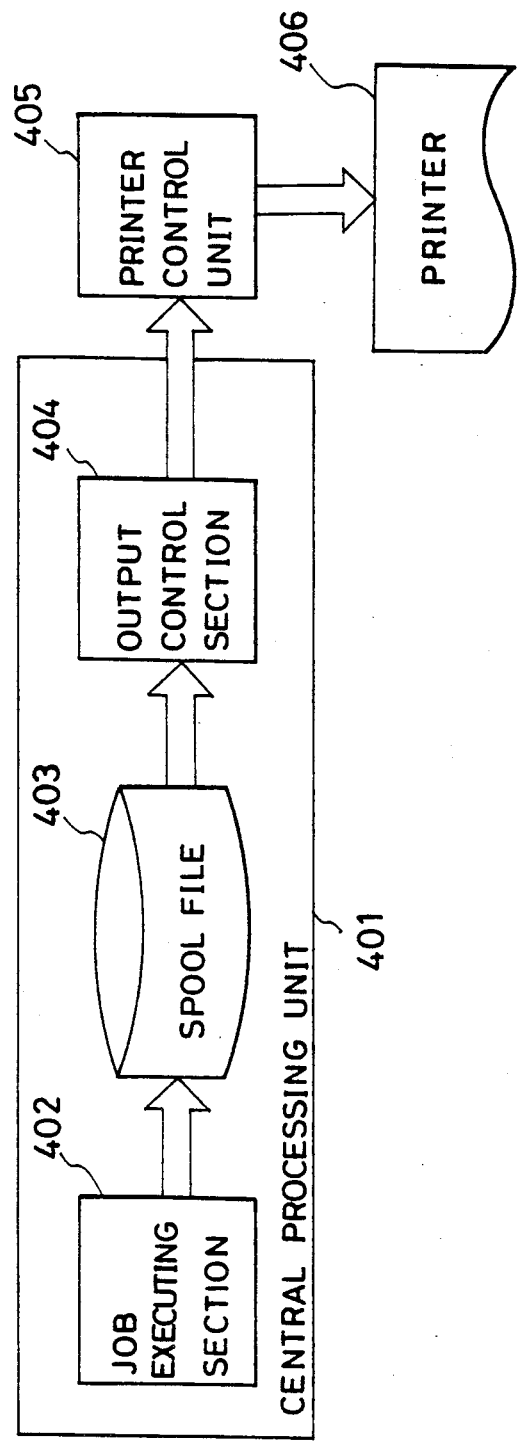
FIG. 4 is a block diagram showing principal functions of the conventional print control system.

The job executing section 402, the printer 406 and the printer control unit 405 may be similar in configuration and operation to those shown in FIG. 4 and the same or similar portions or parts are denoted by the same numbers, respectively.

The job executing section 402, the print data selector means 304, the print mode changing means 305 and the print data holding means 306 are implemented in combination by CPU as the hardware and a control program as the software. Although they are not configured of specifically dedicated hardwares alone in this embodiment as just described, they may alternatively be formed of softwares alone.

The spool file 303 comprises a storage as the hardware and it contains the print data processed in the unit of jobs by CPU 301 and the data held by the print data holding means 306 which are stored in the storage constituting the file.

Figure 3B:
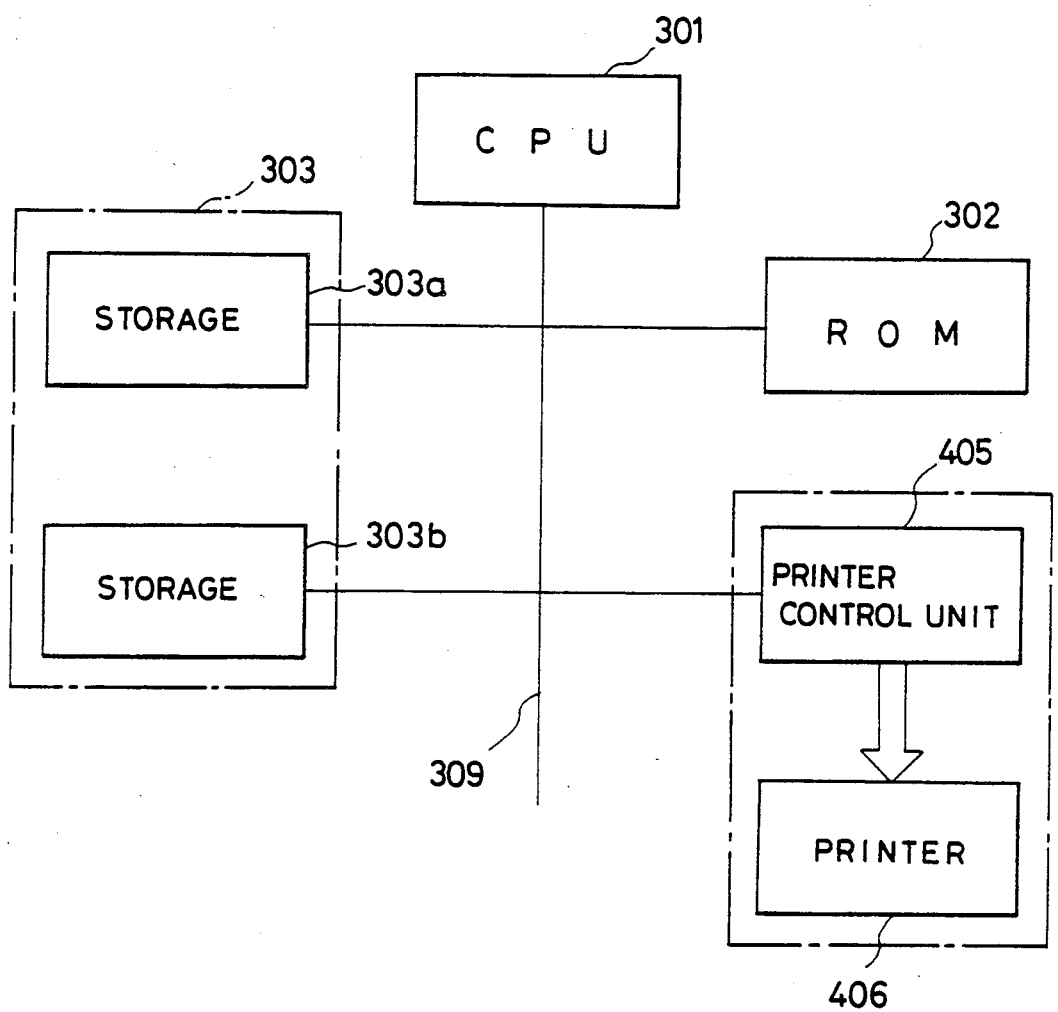
FIG. 3B is a block diagram of hardwares constituting the print control system of FIG. 3A.

The print control system according to this embodiment is formed of the hardwares exemplarily shown in FIG. 3B. More specifically, it comprises CPU 301, ROM (read only memory) 302 for storing a program for controlling CPU 301, storages 303a and 303b storing the normal print data which are data stored normally or stored without being discriminatedly held) and the discriminated print data and constituting the spool file 303, and the printer control unit 405, which are all connected each other through a bus 309.

One of the storages 303a and 303b is used for storing the normal print data sent thereto from the job executing section 402 and another is used for holding the discriminated data. However, the assignment of these tasks is not fixed and the tasks may be assigned to the storages 303a and 303b, alternatingly. In the embodiment as illustrated, the storages exchange their tasks alternatingly.

Figure 5:
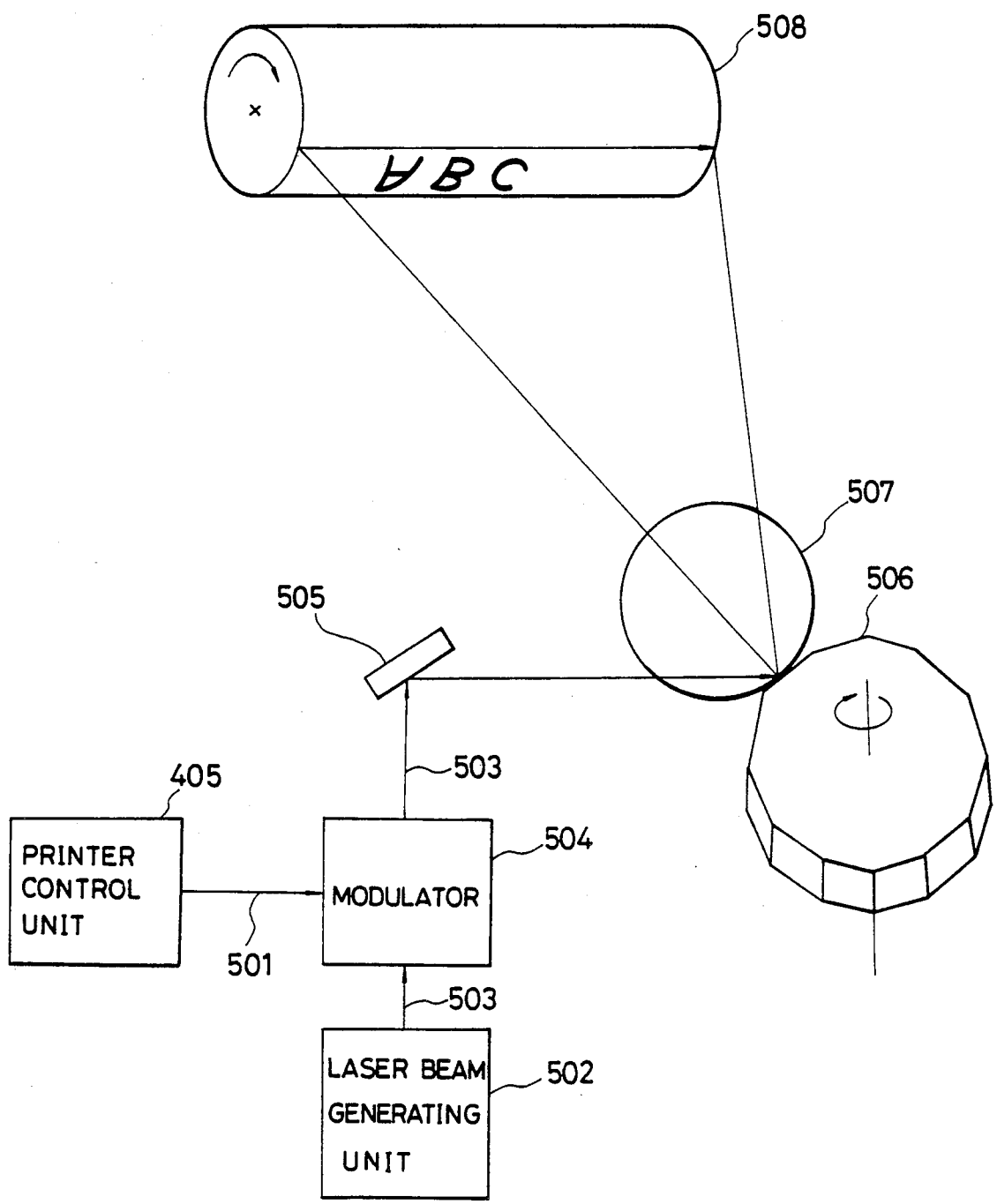
FIG. 5 is a block diagram of one form of the printer to which the present invention and the conventional print control system can be applied.

The print control operation by the print control system according to the this embodiment will now be described referring to FIGS. 3A and 3B. In this embodiment and the embodiments as will be described later, the printing system of FIG. 5 is employed and printing is carried out with different reductions. Of course, it should be noted that the embodiments of the present invention may also be applied to a printing system different from that of FIG. 5 and to magnification printing.

The jobs applied to CPU 301 is executed by the job executing section 402 and the execution results are stored sequentially in the spool file 303. Upon receipt of an output demand, CPU 301 actuates the print data selector means 304. In other words, CPU 301 reads out the control program from ROM 302 to function as the print data selector means 304.

It is now assumed that the print data of a certain job is being carried out and the printing magnification of the data is set in the printer 406. If the printer 406 is not in use and is to be actuated, the printing magnification of the print data to be printed is first set in the printer as shown in FIG. 1.

Figure 6:
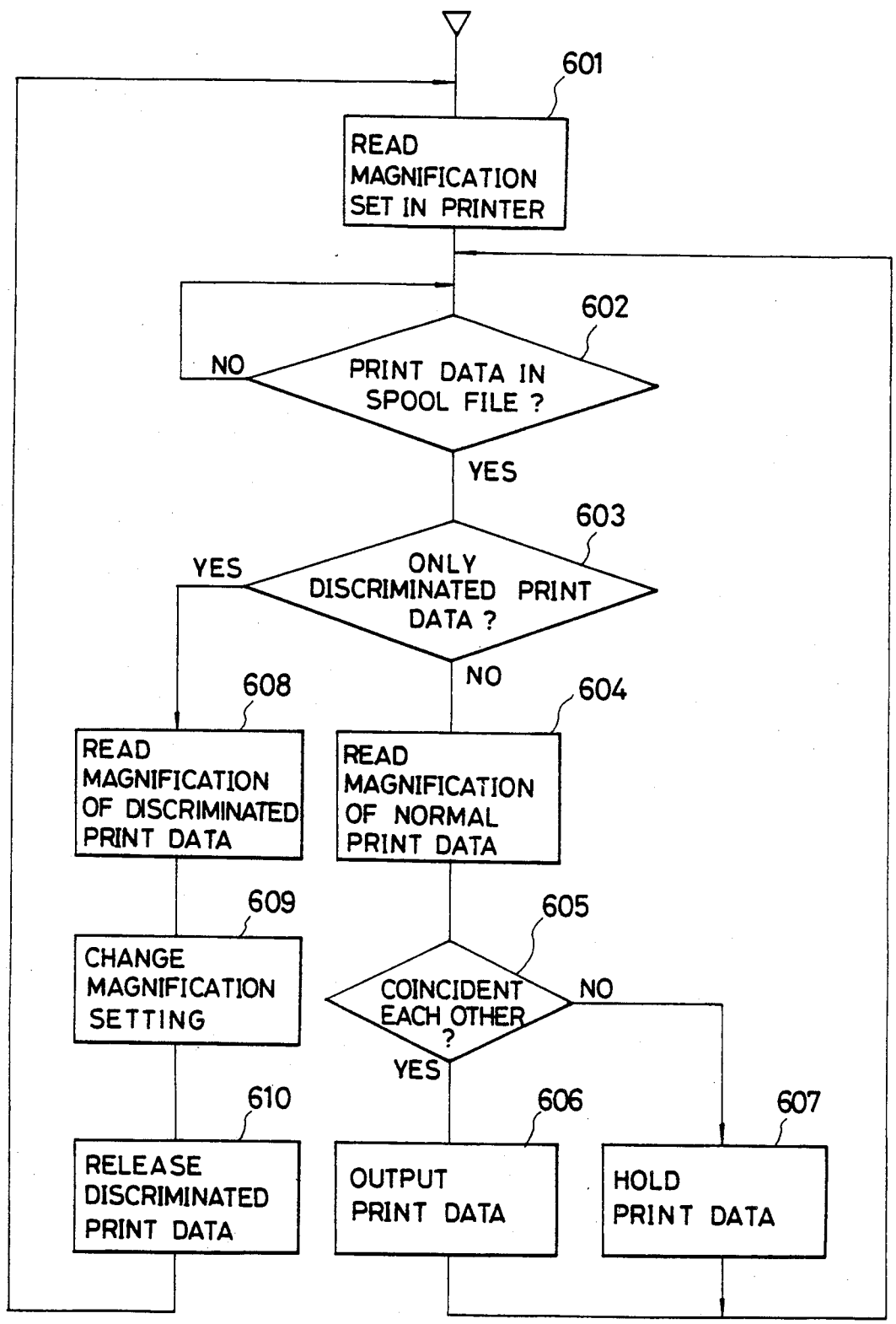
FIG. 6 is a flowchart showing procedures for carrying out the print control method for the system illustrated in FIG. 3A.

The flowchart shown in FIG. 6 corresponds to the steps of from setting of the printing magnification to completion of printing with the same printing magnification in the flowchart shown in FIG. 1.

The print data selector means 304 first reads the printing magnification set in the printer 406 (step 601). The data of the printing magnification is stored in a specific area of the storage 303a or 303b or loaded in a register (not shown) provided inside CPU 301.

The print data selector means 304 then checks whether there are stored in the spool file 303 the print data sent thereto from the job executing section 402. If there are no print data in the spool file 303, the print data selector means 304 is on standby until data are loaded into the spool file 303 (step 602). In the assumed situation, the normal print data sent from the job executing section 402 are stored in the memory 303a and the print data discriminated by the means 304 are held in the memory 303b.

It is further checked whether there are stored only the discriminated print data or not (step 603). If there are the print data sent directly from the job executing section 402 and stored normally as well as the print data discriminatedly held the printing reduction of the normal print data is read (step 604). The so read reduction is compared with the printing magnification of the printer 406 read and stored as described above. If they accord with each other, the normal print data are sent to the printer control unit 405. If they are not coincident with each other, the print data are sent to the print data holding means 306 (steps 605 and 606).

The printer control unit 405 edits the print data sent thereto according to the output format designated therefor and it converts the edited data into dot data to send them to the printer 406. The printer 406 outputs the data in the form of print on paper with the designated magnification.

CPU 301 reads the control program with respect to the print data holding means 306 to function as the means 306 so that it loads the print data discriminated by the selector means 304 into the storage 303b of the spool file 303. Thus, the discriminated print data are held separately from the print data normally stored, throwing the discriminated print data into the held state (step 607).

CPU 301 then returns to step 602 to repeat the procedures as described above.

The procedures are repeated until there are no other print data in the spool file 303 but the print data held discriminatedly at step 603. At this time, CPU 301 actuates the print mode changing means 305. More specifically, CPU 301 reads a program from ROM 302 to function as the print mode changing means 305.

The print mode changing means 305 reads one of the reductions of the print data held in the spool file 303. The read reduction information is transmitted to the printer control unit 405 to change the printing magnification set in the printer 406 (steps 608, 609). In this connection, it is to be noted that the order in which printing magnifications are read is determined arbitrarily. Generally, the selection or setting order of the printing magnification is determined on the first-stored first-read basis. However, if a specific priority order is set, the set of the printing magnification into the printer 406 is made according to the priority order.

Alternatively, the printing magnification which is the closest to the printing magnification which have been set in the printer may be selected and newly set in the printer 406 with first priority. In this case, the change of the printer driving conditions is minimized so that the time necessary to attain the change of the printing magnification is reduced.

The setting of the printing magnification in the printer is carried out in a similar manner to that in the conventional art.

Then, CPU 301 releases the print data held in the storage 303b (step 610). To release the print data, the tasks of the storages 303a and 303b may be exchanged. More particularly, the storage 303b is allotted for the print data which are the results of job execution sent from the job executing section 402, while the storage 303a is allotted for the print data which are discriminatedly held.

Since there remain no print data in the spool file 303 but those which are stored in the storage 303b at step 610 according the method as just described, it is easier, to release the held print data, to exchange the tasks of the storages 303a and 303b than to transfer the print data in the storage 303b to the storage 303a.

When the held print data are so released, the spool file 303 resumes its normal state in which the print data are normally stored therein and CPU 301 returns to step 601 to repeat the procedures as described above. Thus, the print data, whose printing magnification is different from that set before and same as that now set in the printer are allowed to be printed out with priority over the print data of different printing magnifications.

In the embodiment just described, the storages 303a and 303b may alternatively be provided in the form of specifically assigned areas of one storage instead of two discrete storages. The job executing section 402 provided inside CPU 301 in the embodiment may alternatively be provided outside CPU 301.

A second form of the print control system according to the present invention will now be described.

Figure 7A:
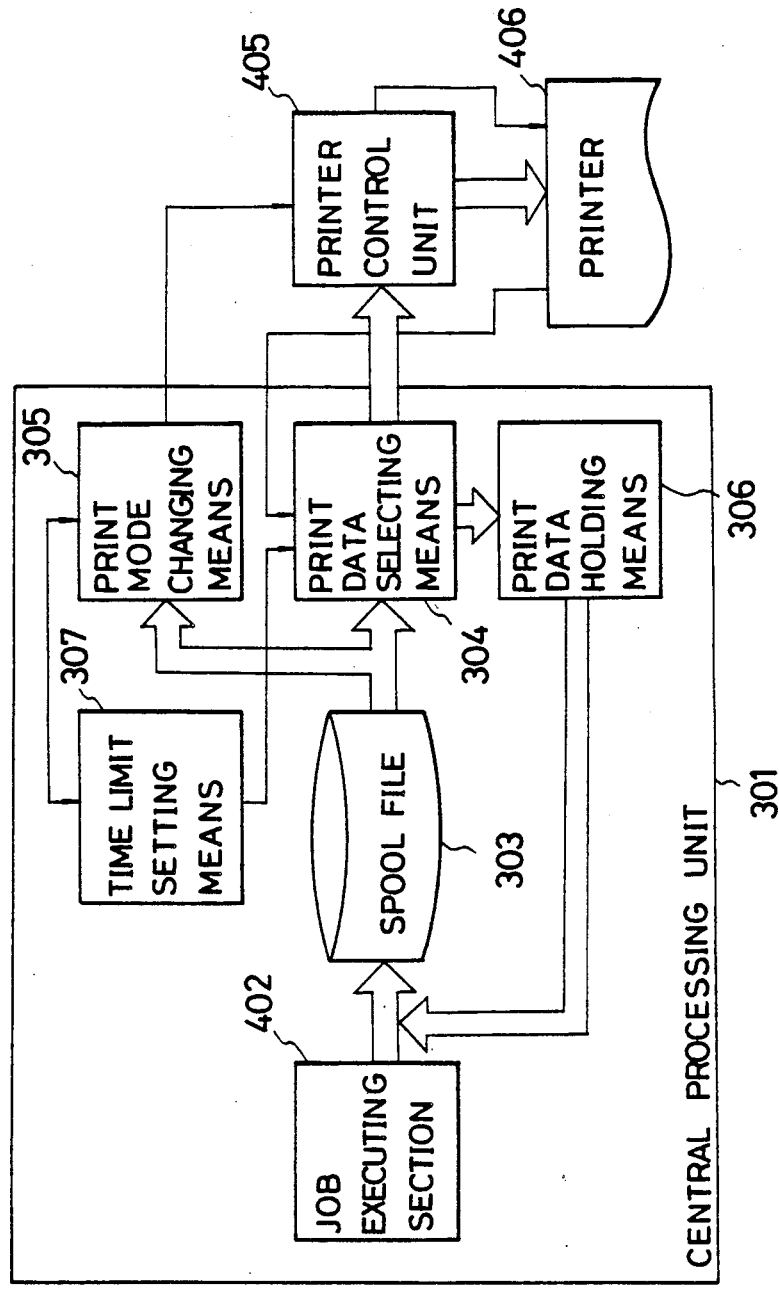
FIG. 7A is a block diagram showing principal functions of another form of the print control system according to the present invention.

FIG. 7A illustrates a print control system according to the second embodiment of the present invention.

The print control system as illustrated in FIG. 7A comprises a time limit setting means 307 in addition to the configuration of the first embodiment. The time limit setting means 307 sets a time limit to stop the print data selector means 304 selecting the print data of the same printing magnification as set in the printer 406. Only the parts which are different from the components of the first embodiment will be described in detail here to avoid redundant repetition.

Figure 7B:
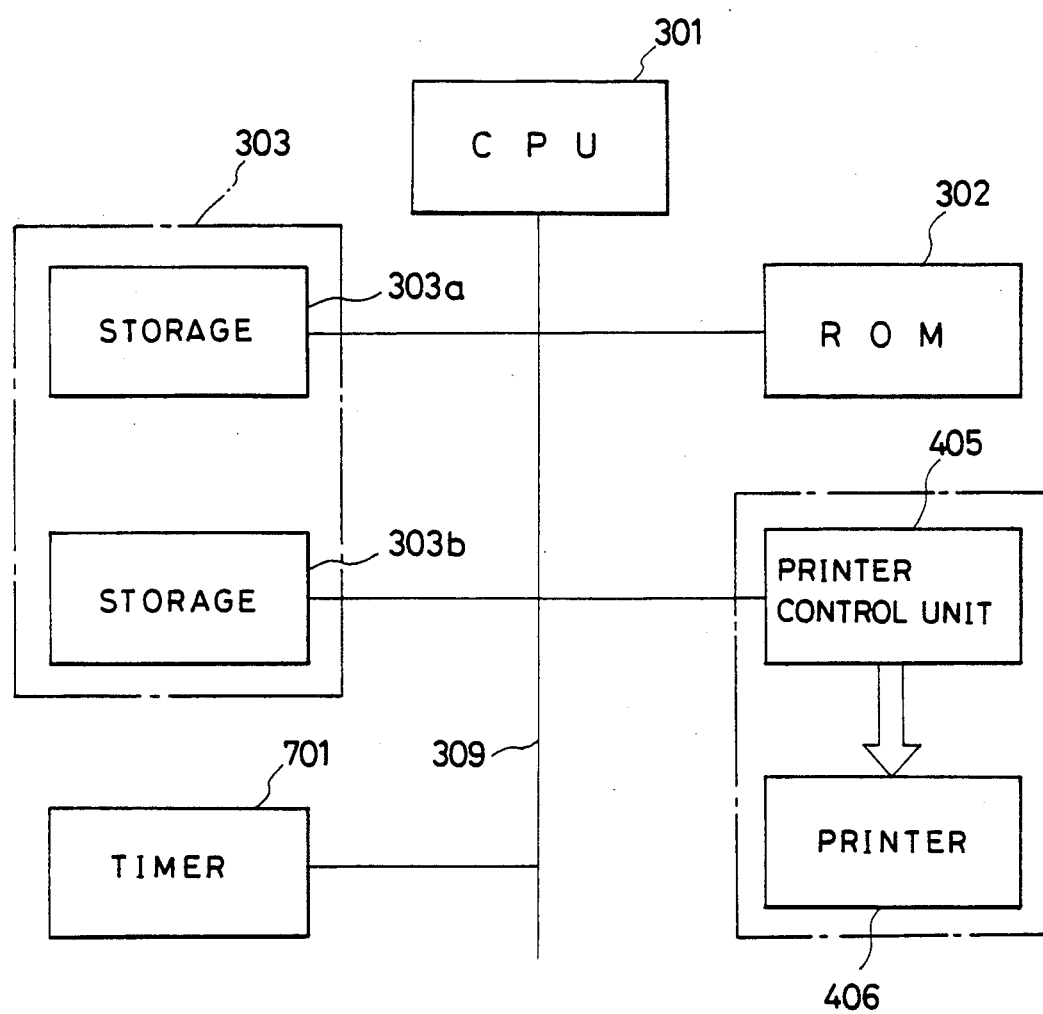
FIG. 7B is a block diagram of hardwares constituting the system of FIG. 7A.

The time limit setting means 307 is so configured that a timer 701 is connected to a bus 309 so that it may be controlled by CPU 301 as illustrated in FIG. 7B. The time limit is determined by considering the length of the job print data, the number of the competitive print data, the frequency of the magnification change, etc. For example, it may be set to be 30 minutes or so.

The print mode changing means 305 sets another printing magnification for the printer 406 in response to the selection stop instruction from the time limit setting means 307 so as to allow the printer 406 to print the data of another printing magnification.

Figure 8:
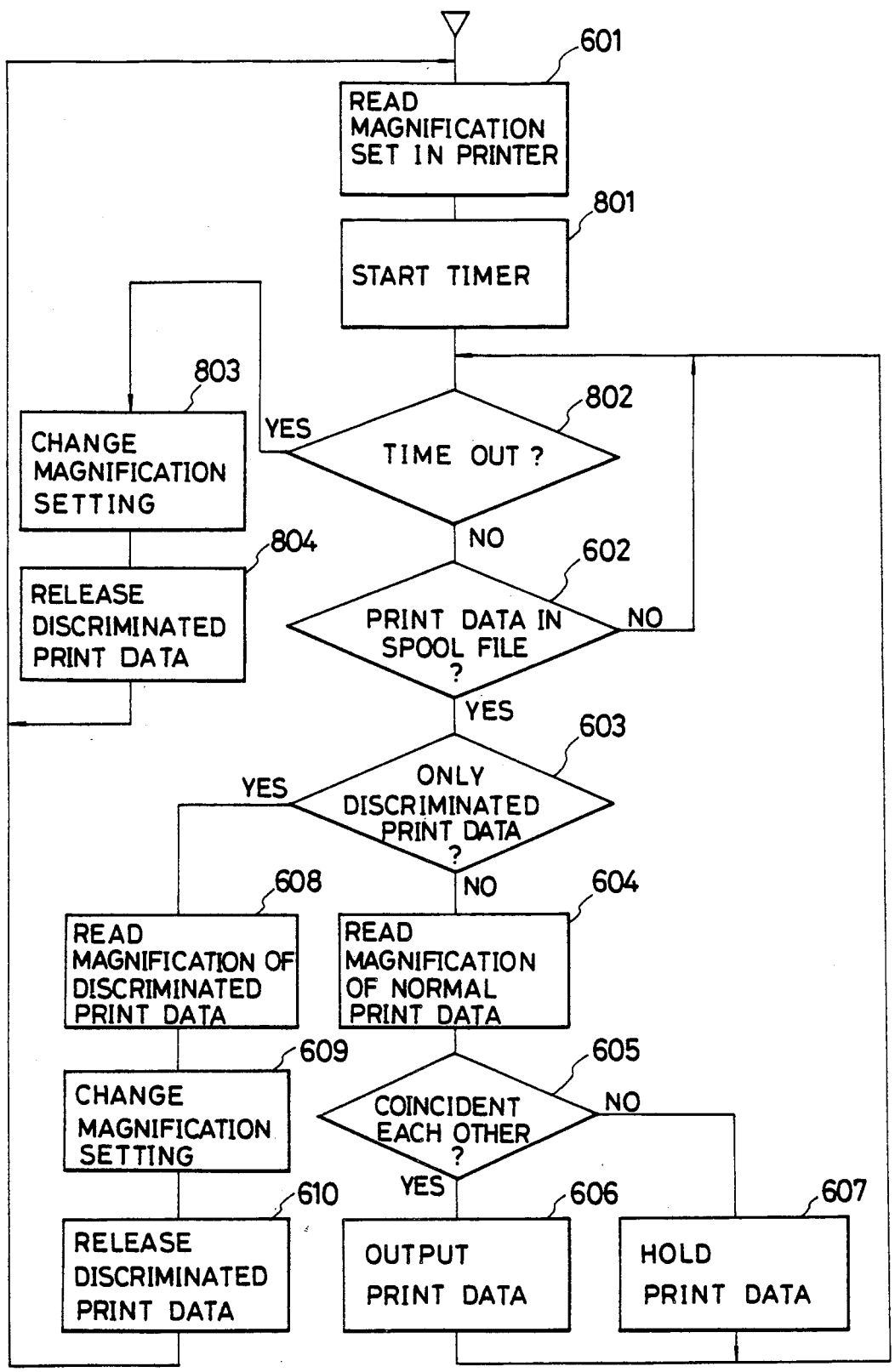
FIGS. 8, 9 and 10 are flowcharts for carrying out further print control methods according to the present invention.

The print control by the printing control system according to the second embodiment will now be described referring to FIGS. 7A, 7B and 8.

In this second embodiment, after the printing reduction has been read (step 601), the timer 701 is allowed to start to actuate the time limit setting means 307 (step 801). At the outset of the repetitions of the procedures, it is first checked whether time is out or not, or time limit is over or not (step 802).

If the time limit is not over, the program proceeds to step 602 to check whether there are print data in the spool file 303 or not. If there are no print data, the program returns to step 802 to be on standby until print data are transmitted thereto.

If there are print data, or data are inputted within the time limit, then it is checked whether the data are held ones or not. If all the data are held ones, the program proceeds to step 608 and then returns to step 601 through steps 609 and 610 to repeat the above-described procedures thereafter.

If there are normal print data which are not held, the program proceeds to step 604 and returns to step 802 through step 606 or 607.

On the other hand, if the time limit is over at step 802, the program proceeds to step 803 to change the printing reduction. The change of the printing reduction is effected in such a manner that a standard magnification which is originally set in the printer itself is selected. For example, if the printer has been in the reduction printing mode, it may resume its standard printing mode of an original size when the set time limit is over. If the set printing mode has been in the standard mode of an original size, the mode is changed to a reduction mode, selecting the printing reduction closest to the original size.

Alternatively, the numbers or frequencies of the respective magnifications are calculated so that the magnification of the highest frequency may be selected as a standard magnification. In this case, the standard magnification is set at step 803 whenever the time limit is over.

The held print data are then released (step 610) as shown in FIG. 6. The program returns to step 601 to repeat the procedures as described above.

According to the second embodiment, the print data of the same printing magnification can be preferentially printed collectively from the print data of various printing magnifications, as in the first embodiment. In addition, the time limit is set in this embodiment to forcibly change or terminate the preferency of the print data of the same magnification to equalize the priorities to the respective print data. Consequently, every print data of a different printing magnification may have substantially equalized priority for printing.

A third embodiment of the present invention will now be described.

The third embodiment differs from the second embodiment of FIG. 7A only in some function of the print control system. In the following description, only the difference is referred to in detail.

The print mode changing means 305 of the third embodiment has a function to check, in response to the data selection stopping instruction, whether there are print data of a printing magnification different from that set in the printer. When the print mode changing means 305 detects, through the check, the print data of a magnification different from that of the printer 406, it sets said magnification in the printer 406 to permit the printer to print the data at the newly set magnification. If the data of a different magnification are not detected, the print data of the magnification same as that set in the printer 406 are allowed to be selected again for another time limit period.

Figure 9:
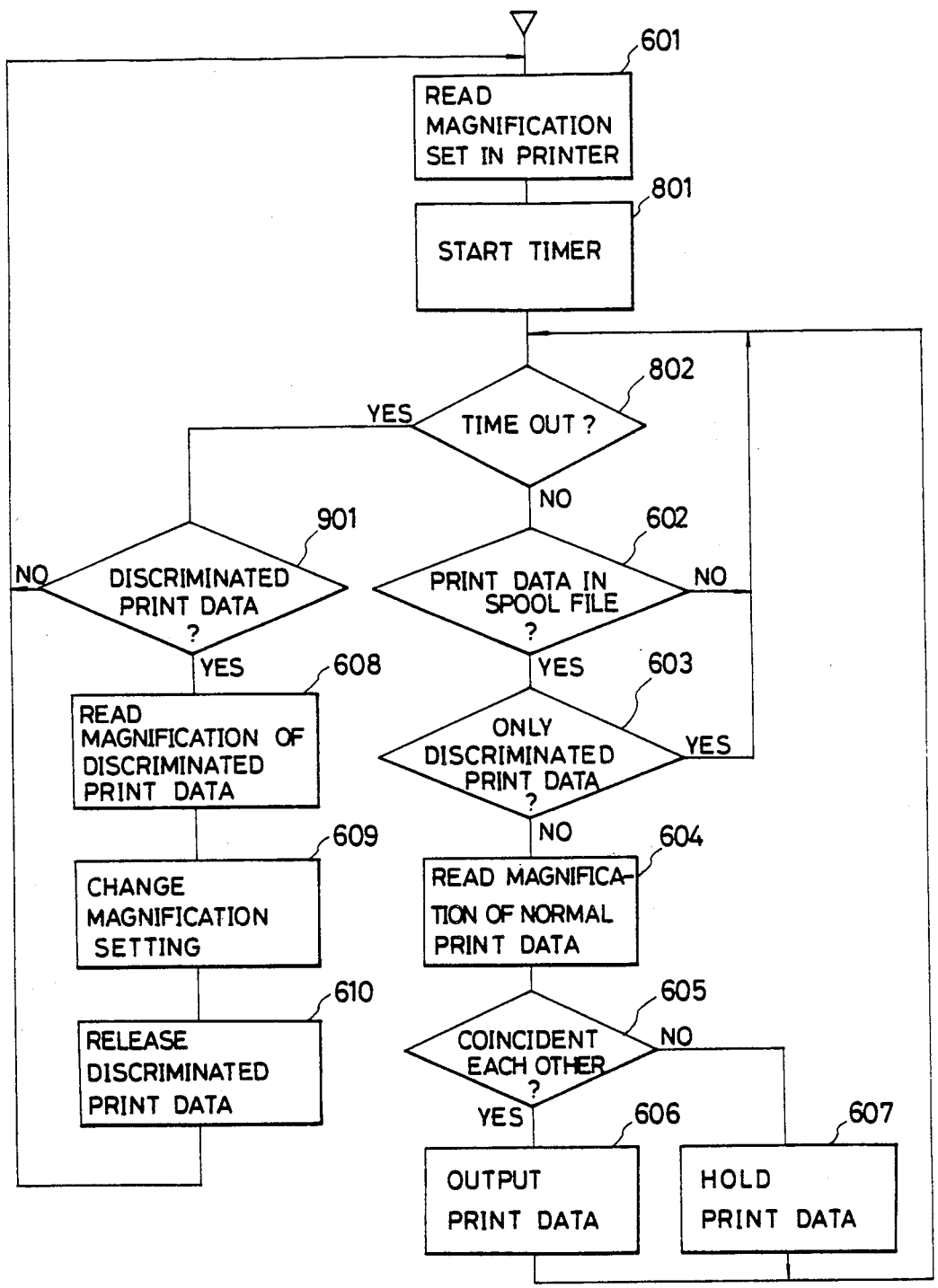

The print control according to the third embodiment will now be described referring to FIGS. 7A, 7B and 9.

In this third embodiment, the timer 701 is let to start after the printing reduction of the printer has been read to allow the time limit setting means 307 to actuate (step 801). At the outset of every repetition of the succeeding procedures, it is checked whether the time is out or not, or the time limit is over or not (step 802).

If the time limit is not over, the program proceeds to step 602 to check if there are print data in the spool file 303 or not. If there are no print data, then the program returns to step 802 to be on standby until further data are sent thereto.

If there are print data, or if further data are inputted before the time limit is over, it is checked whether there are any other data than those held discriminatedly or not (step 603). If there are no other data than those held discriminatedly, the program proceeds to step 802 to be put into a standby state. If there are normal print data which are not held, the program proceed from step 604 through step 606 or 607 to step 802 and the procedures as described above are repeated as in the embodiment shown in FIG. 6. If the time limit is over at step 802, the program proceeds to step 901 to check if there are print data held in the spool file 303 or not. If there are no held data, the program proceeds to step 601 to repeat the procedures as described above.

If there are held print data, one print magnification of the held print data is read (step 608). In this connection, it is arbitrary which print magnification is selected. In the third embodiment, however, the printing magnification is read on the first-held first-selected basis. Of course, if the priority level is set otherwise, the reading order should accords with such priority level.

Thereafter, the reduction of the printer is changed (step 609) and the held print data are released (step 610). The program then returns to step 601 as in the flowchart shown in FIG. 6.

According to the present invention, the print data having the same printing magnification are printed in the lump preferentially over the data of the different magnifications as in the foregoing embodiments. Thus, the frequency of changes of the printing magnifications can be reduced. In addition, the time limit is set and the printing magnification is forcibly changed to another after the expiration of the time limit in the third embodiment. Therefore, the preferential state of the data having a certain magnification is cancelled properly to equalize the priorities for printing. Thus, every print data of different magnification can be printed with substantially equalized priority. Further, since the printing magnification remains as it is without being changed if there are no print data of different printing magnifications when the time limit has been over, further print data of the same printing magnification as set in the printer can be continuously printed without losing time.

A fourth embodiment of the present invention will now be described.

The fourth embodiment is substantially the same as the third embodiment except the way for releasing the print data held in the spool file. Only the difference will be described here.

Figure 10:
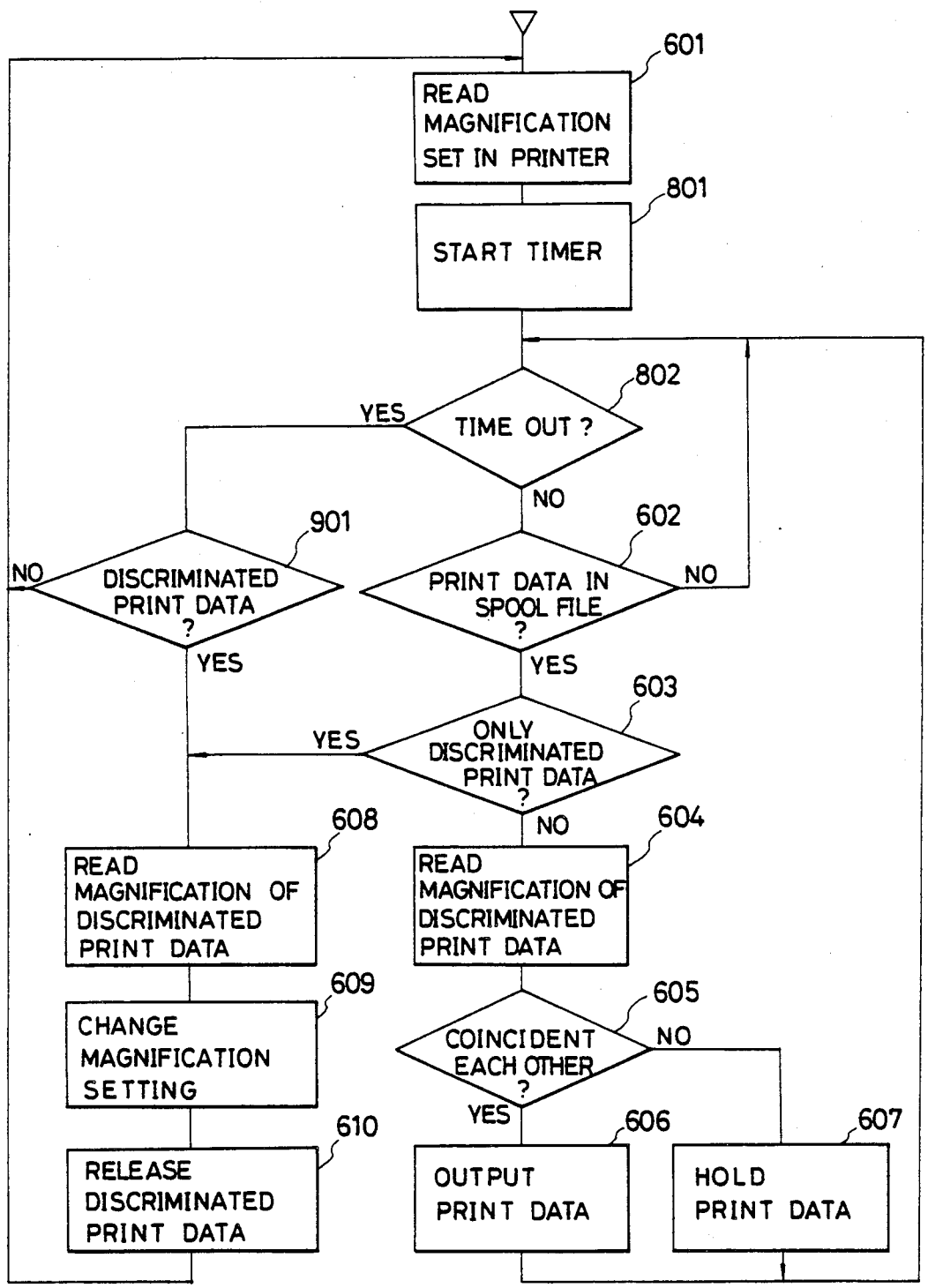

In the fourth embodiment, if there are only printing data held in the spool file 303 at step 603, the program proceeds to step 608 to put the print data into printing as shown in FIG. 10. In the third embodiment, however, if there are only print data held discriminatedly in the spool file 303, the program proceeds to step 802 to be on standby.

In comparison between these two embodiments, the third embodiment operates in a manner such that even if only the print data are held in the spool file 303, the situation will not change until the time is out. Therefore, the print data having the magnification same as that set in the printer still have top priority until the time limit is over. In contrast, the fourth embodiment is so configured that if all the data stored in the spool file 303 are held ones, any printing magnification of the held data is set for the printer to change the printing mode. According to the latter embodiment, the system is not thrown into a standby state so long as the print data are in the spool file 303.

As described above, the present invention may suitably be used for carrying out printing effectively for print data processed by jobs. This invention may also applicable to printing of job data which include different printing sizes or magnifications therein.

In the foregoing embodiments, the print data holding means are provided to discriminate the data checked for their printing magnification but not yet printed from the data which have not been checked and to be used in the checking as to if there are print data having the same magnification as set in the printer. These functions, however, may be carried out by other means. More specifically, the print data holding means of the foregoing embodiments are so configured that the print data themselves are stored in a specific area of the storage preliminarily set, but the addresses of the respective data may alternatively be held in some specific manner, for example, written in a special table dedicated for the held data to hold the data discriminatedly from other, normal print data.

Although the selection is carried out for the print data stored in the spool file in the foregoing embodiments, this invention may further be applied to a system including no spool file, for example, a system in which a plurality of units are connected through a bus and data output is requested from the respective units.

In the foregoing embodiments, the print control system is applied to a laser beam printer using a polygon mirror. This invention, however, is not limited to that type of printer but may also be applied to another type of printer which is capable of changing the printing magnification. For example, this invention may be applied to a printer employing a light emitting diode array as a light source.

The word "magnification" used in this specification and appended claims means not only "enlargement" of an object but also "reduction" of an object.

What is claimed is:

1. A print control method for use with a printing system which includes setting means for setting a printing magnification and is capable of printing data for print with the set printing magnification, comprising the steps of:

selecting data having a printing magnification corresponding to that set by said setting means with priority over other data of a different magnification or magnifications to transmit said data of said set magnification to the printing system to let the printing system print said data of said set magnification preferentially; and setting another printing magnification in the printing system after completion of the printing of said data of said set printing magnification to allow the printing system to start printing with said another printing magnification.

2. A print control method according to claim 1, which further comprises the step of storing the print data into a storage, said step of selecting the data including steps of searching the print data for data having said set printing magnification from the data stored in the storage and taking out said data of said set printing magnification preferentially over the print data of a magnification or magnifications different from said set printing magnification.

3. A print control method according to claim 2, wherein said another printing magnification is selected from the magnification or magnifications of the print data stored in the storage and set in the printing system after completion of the printing of said data of said set printing magnification.

4. A print control method according to claim 2, wherein said step of selecting the data comprises a step of discriminating the print data of the different magnification or magnifications to hold said data discriminatedly from the print data which have not been subjected to searching yet, and said step of setting another printing magnification being carried out after there has become no unsearched print data in the storage.

5. A print control method according to claim 1, wherein the selection of the print data of said set printing magnification as set in the printing system is allowed only within a time limit set preliminarily and said another printing magnification is set in the printing system after the time limit has elapsed.

6. A print control method according to claim 2, wherein the selection of the print data of said set printing magnification as set in the printing system is allowed only within a time limit set preliminarily and said another printing magnification is set in the printing system after the time limit has elapsed.

7. A print control method according to claim 4, wherein the selection of the print data of said set printing magnification is allowed only within a time limit set preliminarily and said another printing magnification is set in the printing system after the time limit has elapsed.

8. A print control method according to claim 1, wherein the selection of the print data of said set printing magnification is allowed only within a time limit set preliminarily and it is checked if there are print data which are of a magnification or magnifications different from that set in the printing system and have not been printed yet after lapse of the time limit, the print data having said set printing magnification being allowed to be selected if there are no relevant print data, and the different magnification or any of the different magnifications being set in the printing system to allow the printing system to start printing with the different magnification.

9. A print control method according to claim 2, the selection of the print data of said set printing magnification is allowed only within a time limit set preliminarily and it is checked if there are print data which are of a magnification or magnifications different from that set in the printing system and have not been printed yet after lapse of the time limit, the print data having said set printing magnification being allowed to be selected if there are no relevant print data, and the different magnification or any of the different magnifications being set in the printing system to allow the printing system to start printing with the different magnification.

10. A print control method according to claim 4, the selection of the print data of said set printing magnification is allowed only within a time limit set preliminarily and it is checked if there are print data which are of a magnification or magnifications different from that set in the printing system and have not been printed yet after lapse of the time limit, the print data having said set printing magnification being allowed to be selected if there are no relevant print data, and the different magnification or any of the different magnifications being set in the printing system to allow the printing system to start printing with the different magnification.

11. A print control system having a printing system with setting means for setting a printing magnification therefor and capable of printing with the set printing magnification, which comprises:

print data selecting means for preferentially selecting print data having a printing magnification corresponding to that set in said setting means with a priority over other print data of a different or different printing magnifications to transmit the data to the printing system; and print mode changing means for setting another printing magnification after completion of the printing of said data of said set printing magnification to change the printing mode of the printing system to another in which printing is effected with said another printing magnification.

12. A print control system according to claim 11, which further comprises a storage for storing the print data, said print data selecting means having a function to check the printing magnifications of the print data stored in the storage, said print data selecting means preferentially taking out the print data of said setting magnification with priority over other print data of a different printing magnification or magnifications.

13. A print control system according to claim 12, which further comprises print data holding means for holding the print data of the printing magnification or magnifications different from said set printing magnification discriminatately from print data which have not been checked with respect to their printing magnifications yet, and wherein said print mode changing means has a function to judge if there are print data in the storage which have not been checked with the print magnifications yet, any of the printing magnifications of the print data discriminatately held in said storage being set in the printing system to allow the printing system to change the printing mode in which the printing is carried out with said another printing magnification when there remain no print data which have not been checked with the printing magnifications.

14. A print control system according to claim 11, which further comprises time limit setting means which sets a time limit and provides the print data selecting means an instruction to end the selection of the print data of said set printing magnification after the time limit has elapsed, and wherein said print mode changing means sets another printing magnification in the printing system in response to said instruction to let the printing system print with the newly set printing magnification.

15. A print control system according to claim 12, which further comprises time limit setting means which sets a time limit and provides the print data selecting means an instruction to end the selection of the print data of said set printing magnification after the time limit has elapsed, and wherein said print mode changing means sets another printing magnification in the printing system in response to said instruction to let the printing system print with the newly set printing magnification.

16. A print control system according to claim 13, which further comprises time limit setting means which sets a time limit and provides the print data selecting means an instruction to end the selection of the print data of said set printing magnification after the time limit has elapsed, and wherein said print mode changing means sets another printing magnification in the printing system in response to said instruction to let the printing system print with the newly set printing magnification.

17. A print control system according to claim 11, which further comprises time limit setting means which sets a time limit and provides the print data selecting means an instruction to end the selection of the print data of said set printing magnification after the time limit has elapsed, and wherein said print mode changing means has a function to check in response to said instruction if there are unprinted print data of a printing magnification or magnifications different from that of said set printing magnification, and it sets, if the unprinted print data of the printing magnification or magnifications different from that of said set printing magnification are detected in the checking, the printing magnification or one of the printing magnifications of said data in the printing system to let the printing system print with the newly set printing magnification, while it allows the print data of said set printing magnification to be selected again if such data are not detected.

18. A print control system according to claim 17, which further comprises time limit setting means which sets a time limit and provides the print data selecting means an instruction to end the selection of the print data of said set printing magnification after the time limit has elapsed, and wherein said print mode changing means has a function to check in response to said instruction if there are unprinted print data of a printing magnification or magnifications different from that of said set printing magnification, and it sets, if the unprinted print data of the printing magnification or magnifications different from that of said set printing magnification are detected in the checking, the printing magnification or one of the printing magnifications of said data in said printing system to let the printing system print with the newly set printing magnification, while it allows the print data of said set printing magnification to be selected again if such data are not detected.

19. A print control system according to claim 13, which further comprises time limit setting means which sets a time limit and provides the print data selecting means an instruction to end the selection of the print data of said set printing magnification after the time limit has elapsed, and wherein said print mode changing means has a function to check in response to said instruction if there are unprinted print data of a printing magnification or magnifications different from that of said set printing magnification, and its sets, if the unprinted print data of the printing magnification or magnifications different from that of said set printing magnification are detected in the checking, the printing magnification or one of the printing magnifications of said data in the printing system to let the printing system print with the newly set printing magnification, while it allows the print data of said set printing magnification to be selected again if such data are not detected.

20. A print control system according to claim 12, which further comprises print data holding means for holding, in association with the print data selection from the storage, print data of a printing magnification or magnifications different from said set printing magnification discriminatately from the print data which have not been checked with respect to the printing magnifications, and time limit setting means which sets a time limit and provides the print data selecting means an instruction to end the selection of the print data of said set printing magnification after the time limit has elapsed, and wherein said print mode changing means has a function to search the print data holding means in response to said instruction for unprinted print data of a printing magnification or magnifications different from that of said set printing magnification and it sets printing magnification or one of the printing magnifications of the detected data in the printing system to let the printing system print with the newly set printing magnification if the unprinted print data of the printing magnification or magnifications different from that of said set printing magnification are detected, while it allows the print data of said set printing magnification or magnifications to be selected again if such data are not detected.

* * * * *